US010374291B2

(12) United States Patent
Schmutzler

(10) Patent No.: US 10,374,291 B2
(45) Date of Patent: Aug. 6, 2019

(54) MULTI RET ACTUATOR HAVING A RELAY CONFIGURATION WITH POSITIONING AND DRIVING MOTORS

(71) Applicant: CommScope Technologies LLC, Hickory, NC (US)

(72) Inventor: Steven Lee Schmutzler, Homer Glen, IL (US)

(73) Assignee: CommScope Technologies LLC, Hickory, NC (US)

( * ) Notice: Subject to any disclaimer, the term of this patent is extended or adjusted under 35 U.S.C. 154(b) by 211 days.

(21) Appl. No.: 15/538,302

(22) PCT Filed: Dec. 21, 2015

(86) PCT No.: PCT/US2015/067037
§ 371 (c)(1),
(2) Date: Jun. 21, 2017

(87) PCT Pub. No.: WO2016/137567
PCT Pub. Date: Sep. 1, 2016

(65) Prior Publication Data
US 2017/0373379 A1    Dec. 28, 2017

Related U.S. Application Data

(60) Provisional application No. 62/120,150, filed on Feb. 24, 2015.

(51) Int. Cl.
*H01Q 1/24* (2006.01)
*H01Q 5/22* (2015.01)
(Continued)

(52) U.S. Cl.
CPC ............. *H01Q 1/246* (2013.01); *F16H 35/18* (2013.01); *F16M 11/048* (2013.01);
(Continued)

(58) Field of Classification Search
CPC .......... H01Q 1/246; H01Q 3/005; H01Q 3/32; H01Q 5/22; H01Q 1/24
(Continued)

(56) References Cited

U.S. PATENT DOCUMENTS 6,573,875 B2    6/2003  Zimmerman et al.
6,603,436 B2    8/2003  Heinz et al.
(Continued)

FOREIGN PATENT DOCUMENTS

| CA | 2713962 A1 | 2/2012 |
| CN | 102150374 A | 8/2011 |
| WO | WO 02/37656 A2 | 5/2002 |

OTHER PUBLICATIONS

International Search Report, PCT International Application No. PCT/US2015/067037, dated Apr. 13, 2016.
(Continued)

*Primary Examiner* — Hai V Tran
(74) *Attorney, Agent, or Firm* — Myers Bigel, P.A.

(57) ABSTRACT

An actuator assembly for adjusting attributes of an antenna array. The actuator assembly provides a multi-RET actuator including a plurality of linear actuators, each including an actuator spur gear, a carriage assembly with an actuator drive motor mounted on a car and a nut attached to the car. A positioning motor is coupled to a lead screw and the nut is threaded onto the lead screw. The car travels on a guide so that the positioning motor and lead screw may be operated to bring the carriage assembly into engagement with a desired one of the linear actuators.

17 Claims, 6 Drawing Sheets

(51) Int. Cl.
*F16M 11/18* (2006.01)
*G08C 19/40* (2006.01)
*H01Q 3/00* (2006.01)
*H01Q 3/32* (2006.01)
*H01Q 5/00* (2015.01)
*F16M 11/04* (2006.01)
*H01P 1/18* (2006.01)
*H01P 5/04* (2006.01)
*H02K 7/06* (2006.01)
*H02K 41/035* (2006.01)
*F16H 35/18* (2006.01)
*F16H 25/20* (2006.01)

(52) U.S. Cl.
CPC ............. *F16M 11/18* (2013.01); *G08C 19/40* (2013.01); *H01P 1/18* (2013.01); *H01P 5/04* (2013.01); *H01Q 3/005* (2013.01); *H01Q 3/32* (2013.01); *H01Q 5/00* (2013.01); *H01Q 5/22* (2015.01); *H02K 7/063* (2013.01); *H02K 41/035* (2013.01); *F16H 25/2006* (2013.01)

(58) Field of Classification Search
USPC .................................................. 343/766, 757
See application file for complete search history.

(56) References Cited

U.S. PATENT DOCUMENTS

| | | | |
|---|---|---|---|
| 8,391,926 B2 | 3/2013 | Secor et al. | |
| 8,674,787 B2* | 3/2014 | Bradley | H01R 13/5812 |
| | | | 333/161 |
| 9,425,506 B2 | 8/2016 | Zimmerman et al. | |
| 2010/0201591 A1* | 8/2010 | Girard | H01Q 1/246 |
| | | | 343/766 |
| 2013/0127377 A1 | 5/2013 | Zhao | |
| 2013/0307728 A1* | 11/2013 | Berger | H01Q 3/32 |
| | | | 342/374 |

OTHER PUBLICATIONS

Written Opinion of the International Searching Authority, PCT International Application No. PCT/US2015/067037, dated Apr. 13, 2016.

International Preliminary Report on Patentability and the Written Opinion of the International Searching Authority corresponding to International Patent Application No. PCT/US2015/067037 (10 pages) (dated Sep. 8, 2017).

First Office Action with English-language translation, CN Application No. 201580073984.9, dated Mar. 5, 2019, 14 pp.

* cited by examiner

MULTI RET ACTUATOR HAVING A RELAY CONFIGURATION WITH POSITIONING AND DRIVING MOTORS

CROSS REFERENCE TO RELATED APPLICATIONS

This application is a 35 U.S.C. § 371 national stage application of PCT International Application No. PCT/US2015/067037, filed Dec. 21, 2015, which itself claims priority to the following U.S. Provisional Application pursuant to 35 U.S.C. § 120, U.S. Provisional Application Ser. No. 62/120,150, filed Feb. 24, 2015, the disclosure and content of both of which are incorporated by reference herein in their entireties. The above-referenced PCT International Application was published in the English langage as International Publication No. WO 2016/137567 A1 on Sep. 1, 2016.

BACKGROUND

The present inventions relate generally to wireless communications antenna systems. In particular, they relate to improvements in actuators for adjusting attributes of wireless base station antennas.

Wireless mobile communication networks continue to evolve given the increased traffic demands on the networks, the expanded coverage areas for service and the new systems being deployed. Cellular ("wireless") communications networks rely on a network of base station antennas for connecting cellular devices, such as cellular telephones, to the wireless network.

Many base station antennas include a plurality of radiating elements in a linear array. Various attributes of the antenna array, such as beam elevation angle, beam azimuth angle, and half power beam width may be adjusted by electrical-mechanical controllers. See, for example, U.S. Pat. Nos. 6,573,875, 6,603,436 and 8,674,787, the disclosures of which are incorporated by reference. In these examples, differential phase shifters may be activated by linearly-reciprocal linkages. The phase shifters may, for example, adjust electrical down tilt by changing the phase relationships in a vertically-oriented, phased array of radiating elements. In other examples, phased arrays may steer beams in the azimuth direction, or phase shifters may be used with hybrid circuits to adjust power division and/or beam width.

In one example of a phase shifter as described in U.S. Pat. No. 8,674,787, a phase shifter assembly includes a phase shifter carrier, a phase shifter printed circuit board mounted on the first phase shifter carrier, a wiper printed circuit board coupled to an input of the phase shifter printed circuit board and having at least a first end coupled to transmission lines on the phase shifter printed circuit board, and a wiper support mechanically coupling the first wiper printed circuit board to the phase shifter printed circuit board. Actuating elements may include a pivot arm and a throw arm. The pivot arm may be rotatably mounted in the phase shifter assembly and be configured to engage a wiper support of at least one of the first and second phase shifter sub-assemblies. The pivot arm may further have a slot oriented substantially parallel to a longitudinal axis of the pivot arm. The throw arm may be mounted to the phase shifter assembly to allow linear movement of the throw arm, the throw arm further having a pin that engages the slot of the pivot arm such that when the throw arm is moved linearly, the pivot arm rotates around a pivot. In this way linear movement of the throw arm is translated into rotational movement of the pivot arm, resulting in rotational movement of the wiper arms. The throw arm may be extended for a bottom of an antenna so that it may be manually or remotely electrically operated by an actuator.

While such phase shifter assemblies work well, increasing demands for additional band width and additional operating bands are creating difficulties. For example, a multiband antenna could require as many as six more electrical actuators to adjust down tilt of each RF band independently of each other. Including numerous, remote electrical tilt actuators results in undesirable levels of crowding, expense, and wiring difficulties at the bottom of the antenna.

SUMMARY OF THE INVENTION

A multi-RET actuator assembly for an antenna array including a plurality of linear actuators each including an actuator spur gear, a carriage assembly with an actuator drive motor mounted on a car and a nut attached to the car, and a positioning motor coupled to a positioning lead screw. The nut is threaded onto the lead screw and at least one guide is provided on which the car travels. The positioning motor and positioning lead screw may be operated to bring the carriage assembly into engagement with the actuator spur gear of a desired linear actuator of the plurality of linear actuators.

DESCRIPTION OF EXAMPLES OF THE INVENTION

The present invention is described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Many different embodiments are disclosed herein, in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and sub combinations of the embodiments described herein, and of the manner and process of making and using them, and shall support claims to any such combination or subcombination.

Figure 1:
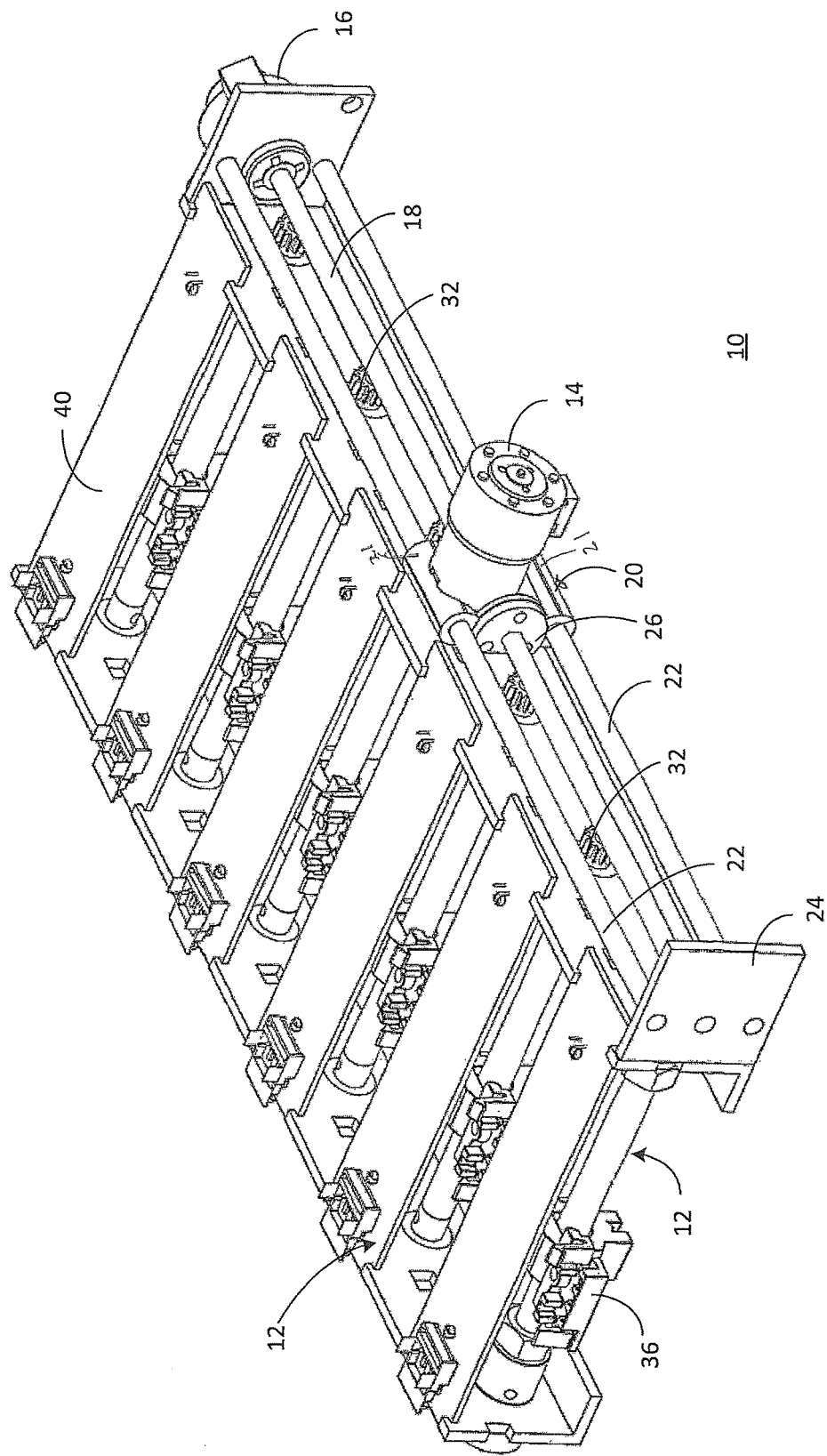
FIG. 1 is an illustration of a first example of a multi-RET actuator assembly according to one embodiment of the present invention.

A first example of a multi-RET (Remote Electrical Tilt) actuator 10 is illustrated in FIG. 1. The multi-RET actuator 10 comprises a plurality of linear actuators 12, an actuator drive motor 14, and a positioning motor 16. The positioning motor 16 drives a lead screw 18. In one embodiment the positioning motor 16 and the actuator drive motor 14 may be stepper motors. The lead screw may comprise an ACME threaded screw. The actuator drive motor 12 is mounted on a car 20. The car 20 has a nut 26 that engages screw 18 and tubes 21 that slide on guides 22. The car 20, actuator drive motor 12 and nut 26 may comprise a carriage assembly. Guides 22, screw 18 and linear actuators 12 are held in place by frame 24.

Car 20 and actuator drive motor 14 may be positioned to engage a spur gear 32 of any linear actuator 12 by operation of the position motor 16 and screw 18. Actuator spur gear 32 has a radius $R_A$ and actuator motor spur gear 52 (FIG. 2, FIG. 8) has a radius $R_M$. Guides 22 and car 20 position the center of motor spur gear 52 a distance of about the sum of $R_A$ and $R_M$ from the center of spur gear 32. This spacing allows motor spur gear 52 to selectively engage each spur gear 32, without being blocked by the spur gears 32.

Figure 2:
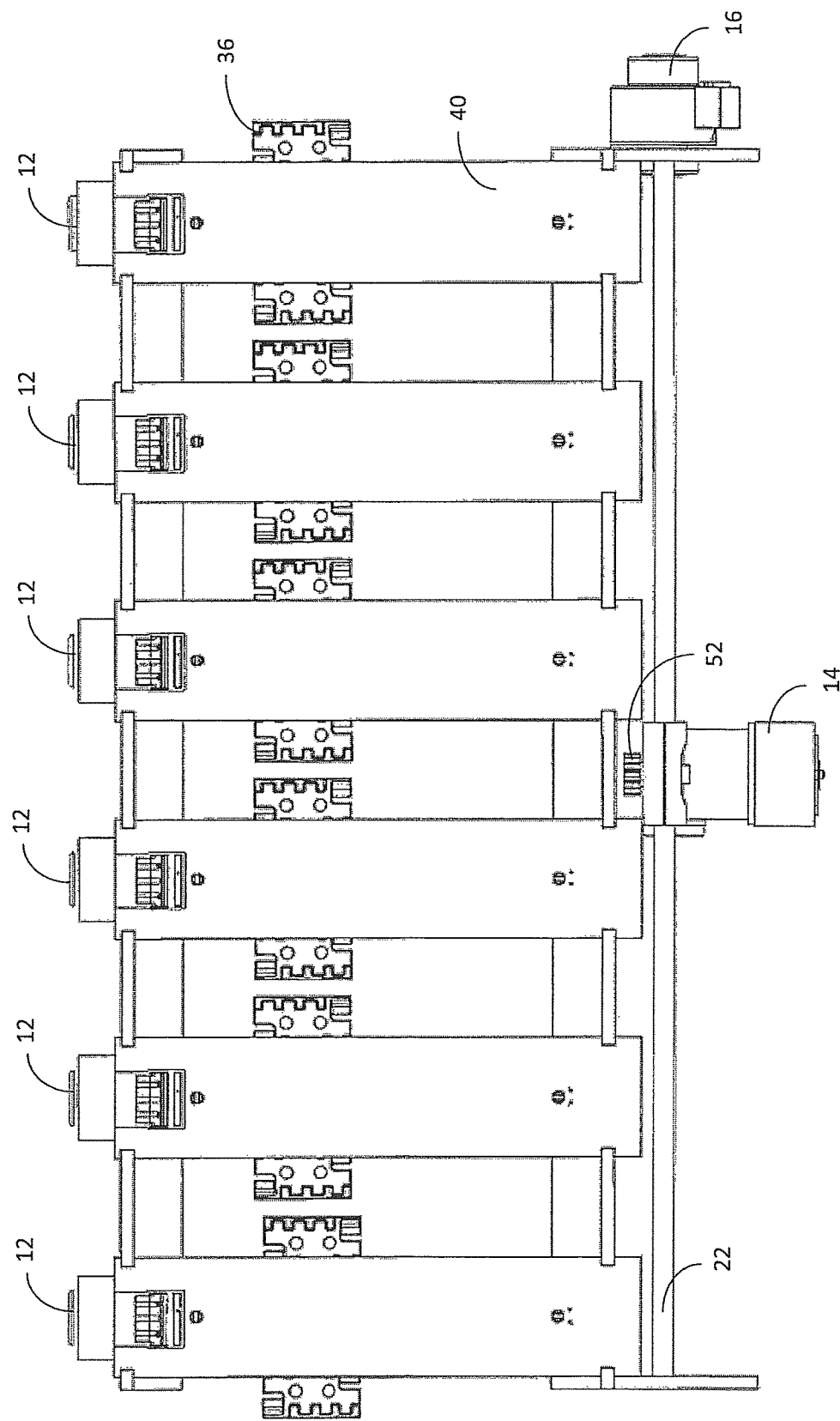
FIG. 2 is a top view of a multi-RET actuator illustrating one embodiment according to the first example of the present invention.
Figure 3:
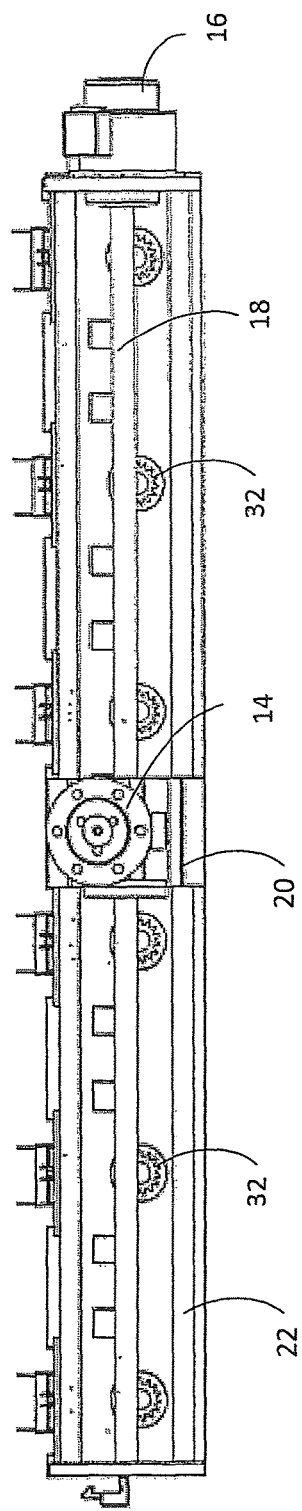
FIG. 3 is a front view illustrating multi-RET actuator illustrating one embodiment according to the first example of the present invention.
Figure 4:
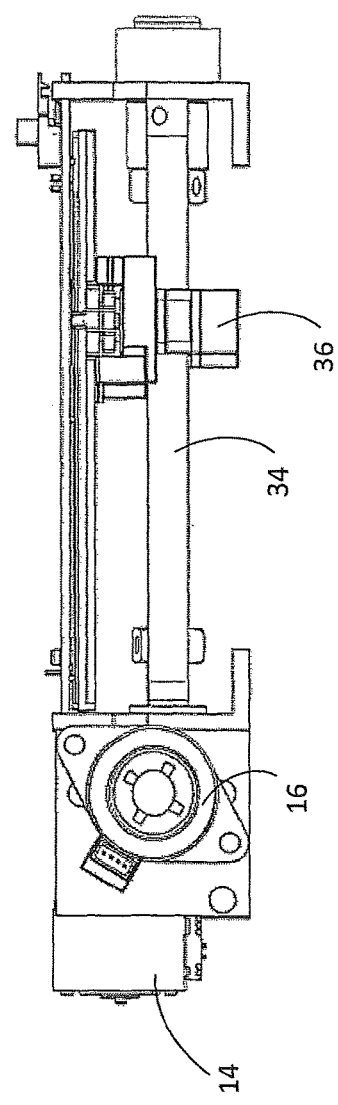
FIG. 4 is a side view of the multi-RET actuator illustrating one embodiment according to the first example of the present invention.

A top view of the multi-RET actuator 10 is illustrated in FIG. 2 which shows the linear actuator 12, the guide 22, positioning motor 16, actuator car 36, actuator drive motor 14, and motor spur gear 52. A front view of the multi-RET actuator 10 is illustrated in FIG. 3 showing a front view of the actuator spur gears 32, guide 22, and car 20. A side view of the multi-RET actuator 10 is illustrated in FIG. 4 further illustrates the positioning motor 16, and the actuator drive motor 14 with the actuator car 36 mounted on the actuator lead screw 34.

Figure 5:
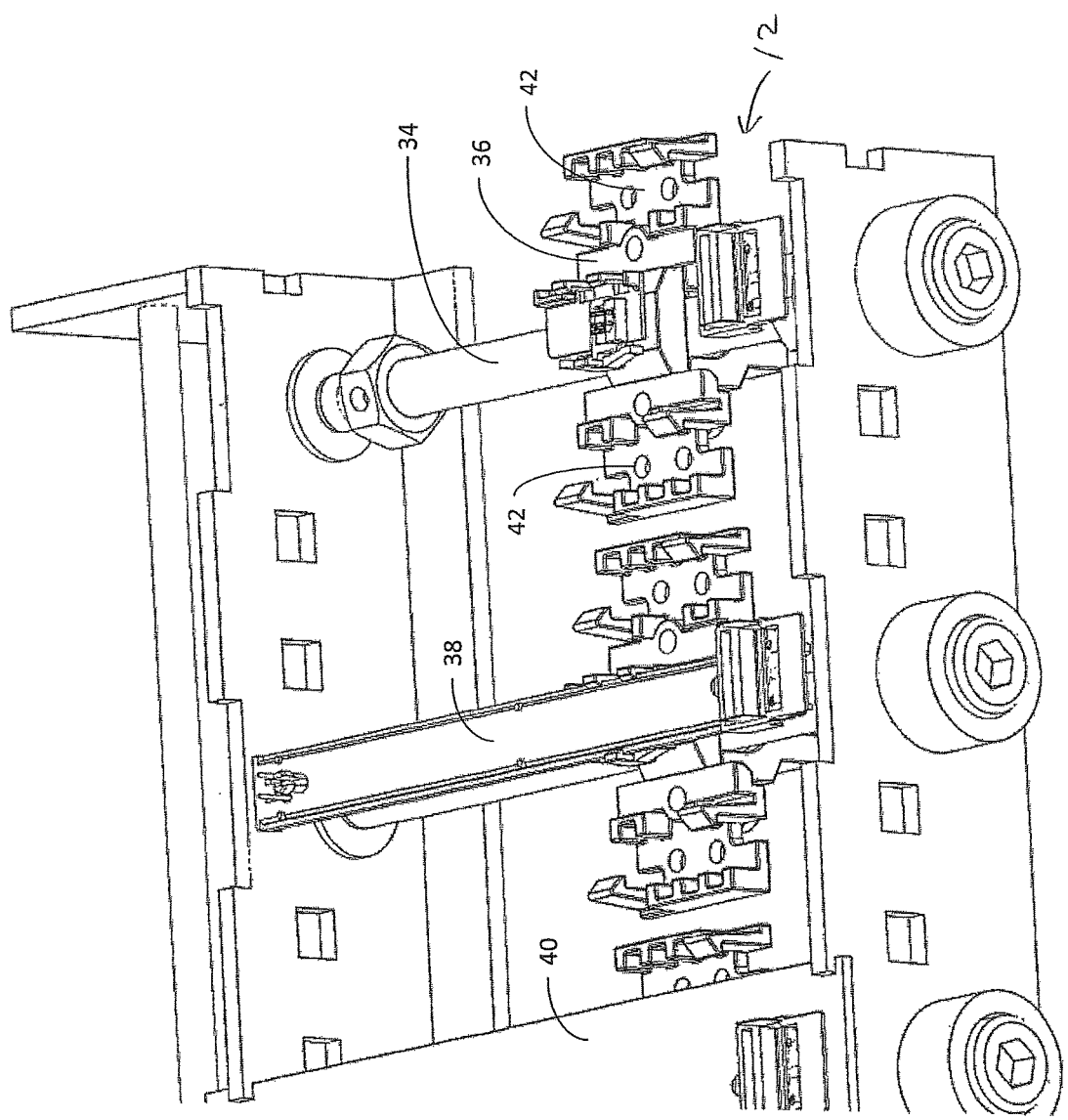
FIG. 5 is a view of a multi-RET actuator with selected components omitted.

Referring to FIG. 5, a rear view of multi-RET actuator 10 is illustrated with selected components omitted to reveal greater detail of the linear actuators 12. Each linear actuator 12 comprises a lead screw 34, an actuator car 36, a position sensor 38, and a PCB (Printed Circuit Board) 40. Spur gear 32 is mounted on the end of lead screw 34. The actuator car 36 includes threads which engage lead screw 34 such that when lead screw 34 is rotated by spur gear 32 and actuator motor 14, the actuator car 36 converts the rotary motion into linear motion and travels up and down lead screw 34. Actuator car 36 further includes one or more throw rod terminations 42, which accept throw rods (not shown). The throw rods may be coupled to phase shifters in the feed network of a phased array antenna as described above. Position sensor 38 senses the position of actuator car 36. This may be done by metallic contact, magnetic sensing (e.g., Hall effect) or other suitable means.

Figure 6:
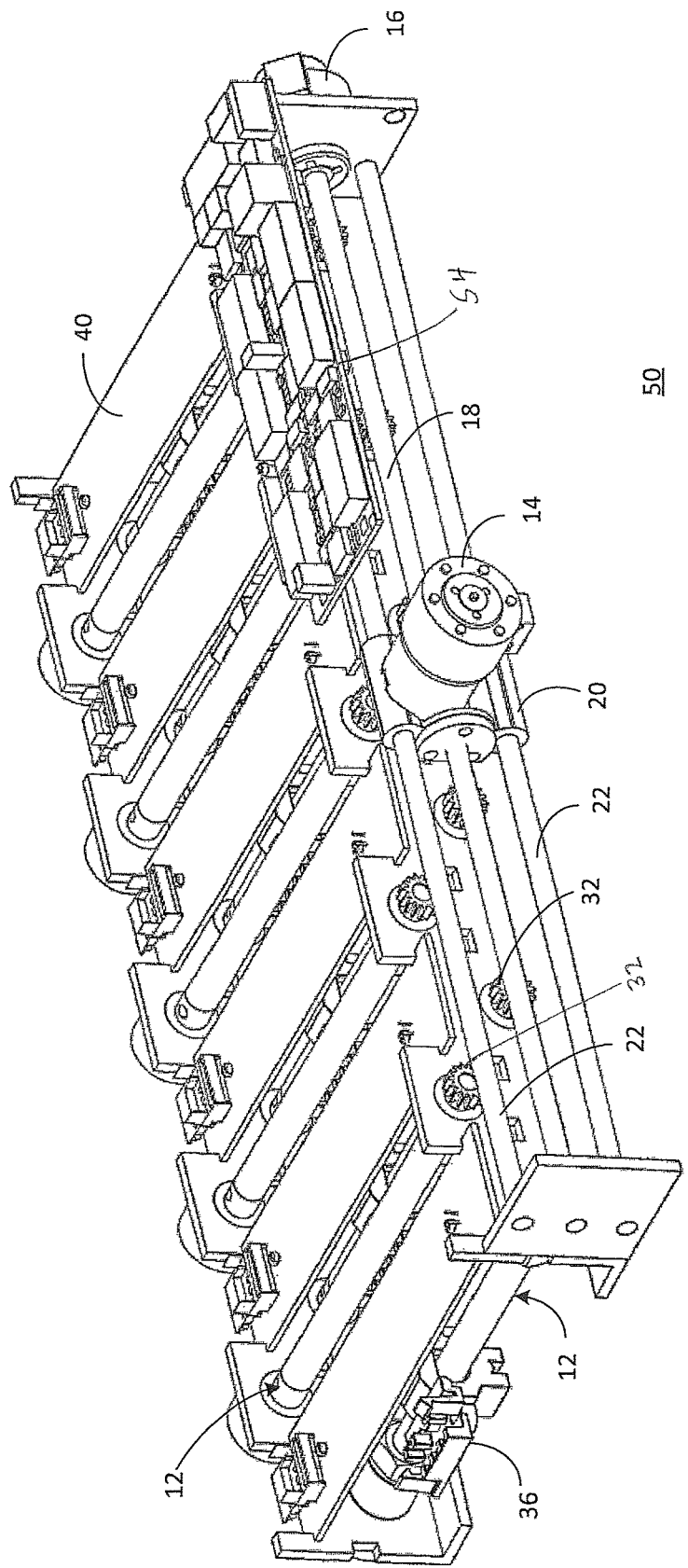
FIG. 6 is an illustration of another example of a multi-RET actuator assembly according to one embodiment of the present invention.
Figure 7:
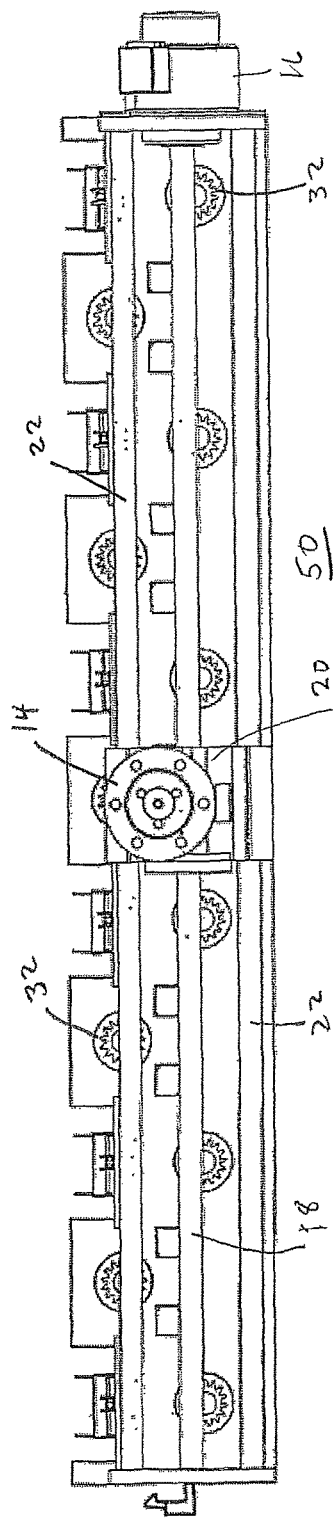
FIG. 7 is a front view of a multi-RET actuator assembly illustrating one embodiment according to the example of FIG. 6.
Figure 8:
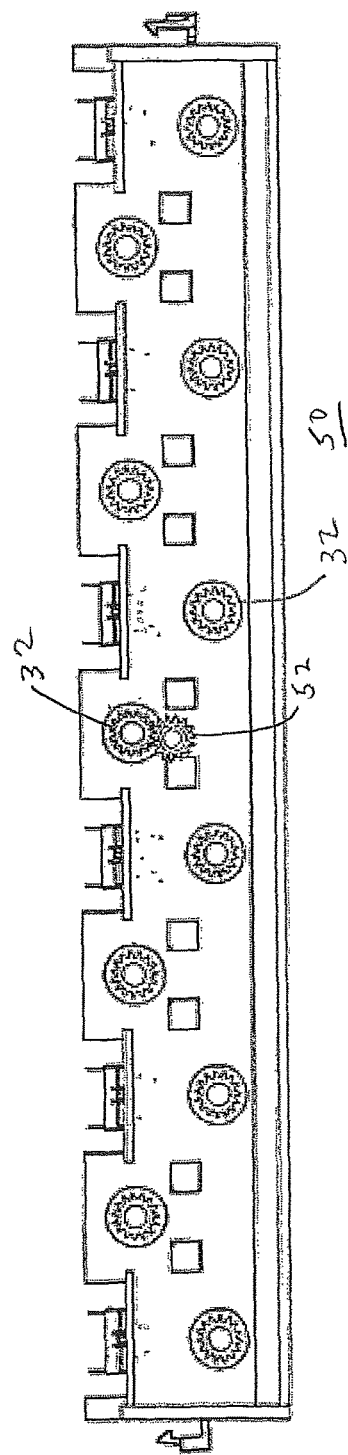
FIG. 8 is a front view of a multi-RET actuator assembly with some components hidden.

FIGS. 6-8 illustrate a second example of a multi-RET actuator 50 according to the present invention. In this example, there are two layers of linear actuators 12. The centers of the spur gears 32 of the linear actuators 12 are spaced apart a distance the sum of $2R_M$ and $2R_A$ and the actuator motor 14 and spur gear 52 travel between the two layers. This allows the actuator motor to selectively engage each spur gear 32 without being blocked by any of the spur gears 32.

Also illustrated in FIG. 6 is controller board 54. A similar controller board would be included in the example of FIG. 1. FIG. 7 is a front view of multi-RET actuator 50. FIG. 8 is a front view of multi-RET actuator 50 with guides 22, car 20 and actuator motor 14 hidden to reveal spacing of actuator spur gears 32 and motor spur gear 52.

In operation, controller board 54 operates positioning motor 16 to rotate screw 18 until car 20 moves actuator motor 14 into engagement with spur gear 32 of a desired linear actuator 12. Guides 22 may include position sensors to detect a position of car 20. Controller board 54 then operates actuator motor 14 until actuator motor car 36 is in a desired position. This may be done by feedback from position sensor 38 or by counting rotations or steps of the actuator motor 14. Actuator motor 14 may be coupled to controller board 54 by ribbon cable, via guides 22, or by other suitable means.

A benefit of the present invention is that the actuator motor 14 may be positioned such that it is disengaged from all of the spur gears 32. See, e.g., FIG. 1. This has the effect of locking each of the linear actuators 12 in place. In this locked mode, controller board may operate actuator motor 14 and positioning motor 16 to confirm proper operation (or detect a malfunction) periodically without affecting down tilt or other beam attributes of the phased array antenna.

Although embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense and it is intended that the invention be limited only to the extent required by the appended claims and the applicable rules of law.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A multi-RET actuator, comprising:
   a plurality of linear actuators, each including an actuator spur gear, an actuator lead screw, and an actuator car;

a carriage assembly, including an actuator drive motor mounted on a car, and a nut;
a positioning motor coupled to a positioning lead screw, the nut threaded onto the lead screw; and
at least one guide on which the car can travel;
wherein the positioning motor and positioning lead screw are operable to drive the carriage assembly into engagement with the actuator spur gear of a desired linear actuator of the plurality of linear actuators, and
wherein each actuator car further comprises a respective one throw rod termination accepting a throw rod coupled to a phase shifter in a phased array antenna feed network.

2. The multi-RET actuator of claim 1, wherein the actuator drive motor includes a motor spur gear having a radius $R_M$ and each linear actuator spur gear has a radius $R_A$ and wherein the guide and car position a center of the motor spur gear a distance of about the sum of $R_A$ and $R_M$ from a center of the actuator spur gear such that the motor spur gear selectively engages each actuator spur gear without being blocked by the actuator spur gear.

3. The multi-RET actuator of claim 1, wherein the actuator spur gear is mounted on one end of the actuator lead screw, and the actuator car has threads that engage the actuator lead screw such that the actuator car travels along the actuator lead screw when the actuator lead screw is rotated by the actuator spur gear.

4. The multi-RET actuator of claim 1, wherein each respective linear actuator of the plurality of linear actuators includes a position sensor which senses position of the actuator car.

5. The multi-RET actuator of claim 4, wherein the position sensor is one of a metallic contact sensor and a magnetic sensor.

6. A multi-RET actuator, comprising:
a plurality of linear actuators, wherein each linear actuator comprises an actuator spur gear, an actuator lead screw, and an actuator car, and wherein the actuator spur gear is coupled to the actuator lead screw and the actuator car travels along the actuator lead screw when the actuator lead screw is rotated in response to rotation of the actuator spur gear;
a positioning motor coupled to a positioning lead screw, wherein the positioning motor to rotates the positioning lead screw; and
an actuator drive motor mounted on a car and coupled to a motor spur gear, wherein the car moves along the positioning lead screw when the positioning lead screw is rotated by the positioning motor,
wherein the positioning motor and the positioning lead screw position the motor spur gear into engagement with the actuator spur gear of a selected one of the linear actuators, and
wherein each actuator car further comprises a respective one throw rod termination accepting a throw rod coupled to a phase shifter in a phased array antenna feed network.

7. The multi-RET actuator of claim 6, wherein the motor spur gear has a radius $R_M$ and each actuator spur gear has a radius $R_A$ and wherein the center of the motor spur gear is positioned a distance of about the sum of $R_A$ and $R_M$ from the centers of the actuator spur gears such that the motor spur gear selectively engages each actuator spur gear without being blocked by the actuator spur gear.

8. The multi-RET actuator of claim 6, wherein the actuator drive motor and the motor spur gear are configured to travel between the two layers of the plurality of linear actuators to selectively engage an actuator spur gear.

9. The multi-RET actuator of claim 6, wherein each respective linear actuator of the plurality of linear actuators comprises a position sensor configured to sense the position of the actuator car.

10. The multi-RET actuator of claim 9, wherein the position sensor is a metallic contact sensor or a magnetic sensor.

11. The multi-RET actuator of claim 6, wherein each linear actuator is configured to be locked in place when the actuator drive motor is disengaged from the actuator spur gear of the respective linear actuator.

12. A multi-RET actuator, comprising:
a plurality of linear actuators stacked in two layers, wherein each linear actuator comprises an actuator spur gear, an actuator lead screw, and an actuator car, wherein the actuator spur gear is mounted on a first end of the actuator lead screw and the actuator car engages and travels along the actuator lead screw when the actuator lead screw is rotated by the actuator spur gear;
a positioning motor coupled to a positioning lead screw; and
an actuator drive motor mounted on a car and coupled to a motor spur gear, the car comprising a nut engaging the positioning lead screw and further comprising at least one tube gliding on at least one guide on which the car can travel;
wherein the positioning motor and the positioning lead screw position the motor spur gear into engagement with the actuator spur gear of a desired linear actuator of the plurality of linear actuators,
wherein the actuator drive motor and the motor spur gear travel between the two layers to selectively engage the actuator spur gears, and
wherein each actuator car further comprises a respective throw rod termination accepting a throw rod coupled to a phase shifter in a phased array antenna feed network.

13. The multi-RET actuator of claim 12, wherein each respective linear actuator of the plurality of linear actuators comprises a position sensor configured to sense the position of the actuator car.

14. The multi-RET actuator of claim 13, wherein the position sensor is a metallic contact sensor or a magnetic sensor.

15. The multi-RET actuator of claim 12, further comprising a controller configured to operate the positioning motor.

16. The multi-RET actuator of claim 15, wherein the controller is further configured to operate the actuator drive motor.

17. The multi-RET actuator of claim 12, wherein each linear actuator is configured to be locked in place when the actuator drive motor is disengaged from the actuator spur gear of the respective linear actuator.

* * * * *